United States Patent [19]
Hudson et al.

[11] 3,872,739
[45] Mar. 25, 1975

[54] THROTTLE RESISTOR

[76] Inventors: Roger Paul Hudson, 4575 Mont Taylor, Santa Rosa, Calif. 95404; Jack Michael Trione, 1606 San Raman Way, Santa Rosa, Calif. 95405

[22] Filed: Feb. 15, 1974

[21] Appl. No.: 443,000

[52] U.S. Cl. ................................................. 74/513
[51] Int. Cl. ............................................... G05g 1/14
[58] Field of Search ......... 74/513, 514; 193/198 DB

[56] References Cited
UNITED STATES PATENTS

| | | | |
|---|---|---|---|
| 1,635,473 | 7/1927 | Gibson | 74/513 |
| 1,700,643 | 1/1929 | Nordell | 74/513 |
| 2,207,435 | 7/1940 | Jones | 74/513 |

*Primary Examiner*—Wesley S. Ratliff, Jr.
*Attorney, Agent, or Firm*—Townsend and Townsend

[57] ABSTRACT

A spring biased foot actuated automobile accelerator pedal has a plunger mounted to intercept the path of the accelerator at a predetermined position typically at a point partially along the path of accelerator depression. The plunger is preferably positioned to contact the under surface of the automobile accelerator pedal at a depression sufficient to power the automobile at a speed limit. The plunger is provided with a spring resistance to yield and permit further depression of the accelerator upon contact by the automobile accelerator pedal. The plunger provides increased resistance to accelerator depression beyond the point of partial accelerator depression. This provides the driver with a sensory impression of relative accelerator depression to limit vehicle maximum speed, make the driver aware of rapidly accelerated starts, and encourage engine throttle economy.

3 Claims, 4 Drawing Figures

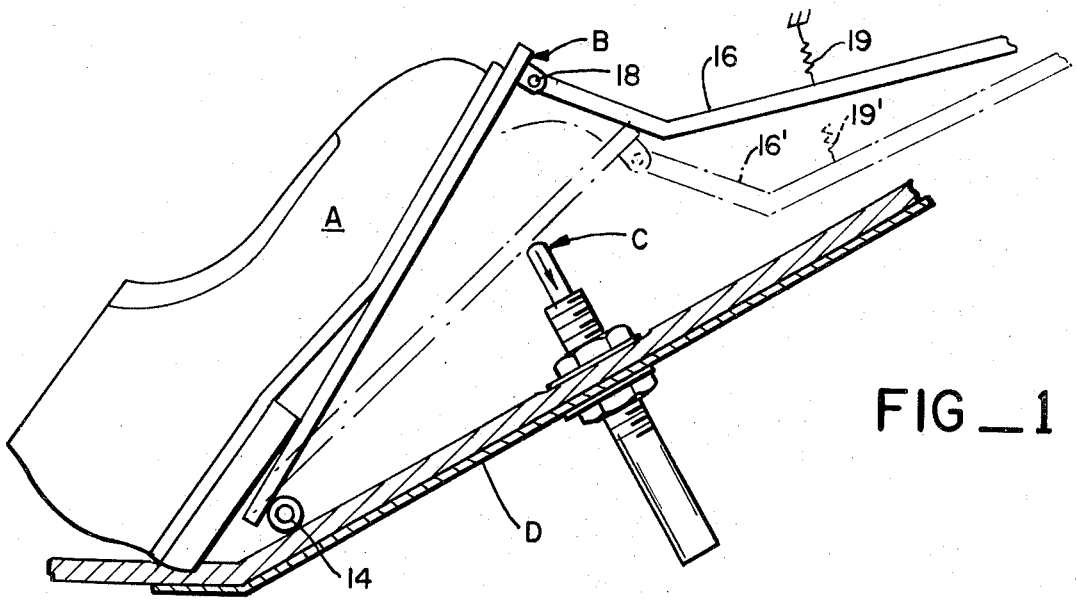
FIG_1
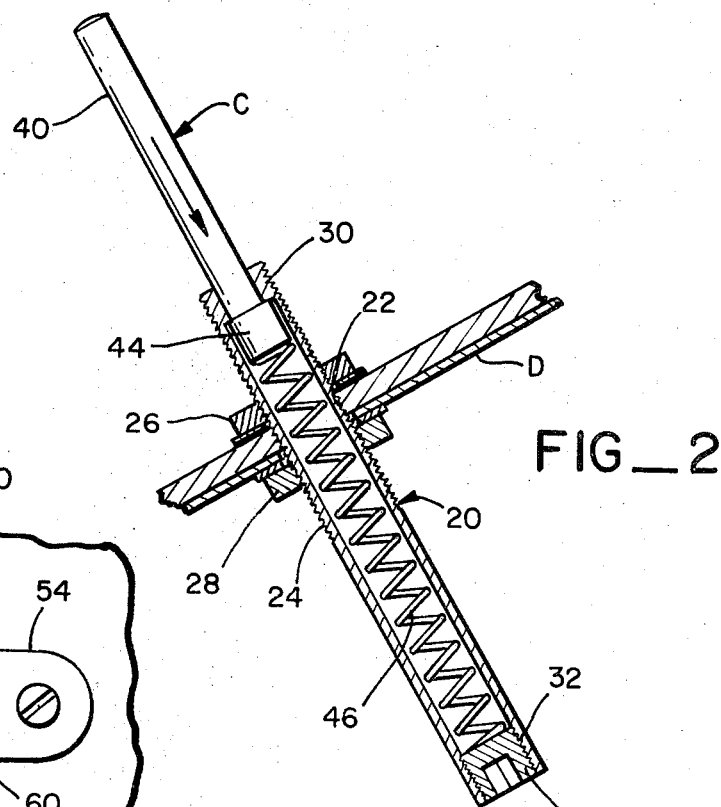
FIG_2
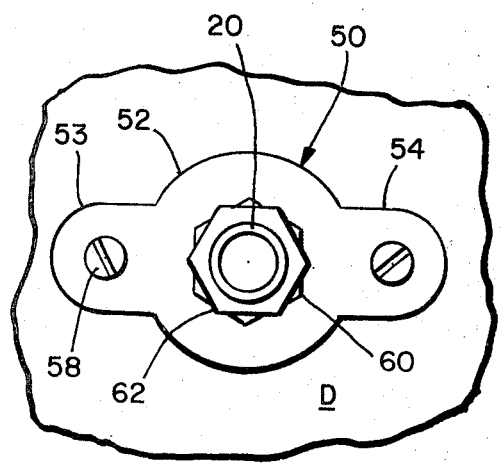
FIG_3
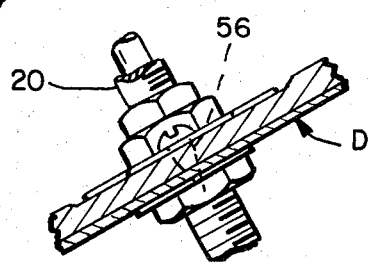
FIG_4

THROTTLE RESISTOR

This invention relates to automobiles and more particularly to apparatus for providing increased resistance in opposition to automobile accelerator depression.

SUMMARY OF THE PRIOR ART

Existant automobiles are commonly equipped with accelerators having soft spring tension. This soft spring tension commences at the point the accelerator is initially depressed and remains essentially constant from the beginning of the accelerator depression through to the end of the accelerator depression, where the accelerator is referred to as "floored."

In the absence of a speed control device, the driver must rely on his eyes and ears as an indication of relative vehicle speed. Typically, the ears have been insufficient to judge speed. Variation in relative wind speed as well as road surface conditions result in the hearing sense of the driver being insufficient to indicate speed of the vehicle.

The eyes of the driver are similarly unreliable. Typically, the driver must keep his eyes on the road to the point where even glances at the speedometer are hazardous. Moreover, with drives of long duration, the driver loses his sense of visual speed.

Finally, the position sensing nerves attached to the legs of the body are most effective when a position (such as a preselected placement of the foot on an accelerator pedal) is initially assumed. If the foot is left in the relatively constant position on an accelerator pedal, the driver's sense of position of the foot with respect to the pedal is often lost. This loss not only occurs when the foot is held in the same position for long periods of time, but additionally is aggravated by the fatigue produced when a driver assumes a sitting and driving position over long periods of time.

Automated cruise controls attached to the automobiles are known. These cruise controls are typically vacuum connected to the vehicle carburetor or manifold as well as simultaneously electrically connected to the speedometer of the vehicle. Such devices are expensive to install, require relatively constant maintenance, and furthermore require additional and unnecessary driver manipulation to activate and deactivate when overriding of the installed cruise control is desired.

SUMMARY OF THE INVENTION

A spring biased foot actuated automobile accelerator pedal has a plunger mounted to intercept the path of the accelerator at a predetermined position typically at a point partially along the path of accelerator depression. The plunger is preferably adjusted to contact the under surface of the automobile accelerator pedal at a depression sufficient to power the automobile at a speed limit. The plunger is provided with a spring resistance to yield and permit further depression of the accelerator upon contact by the automobile accelerator pedal. The plunger provides increased resistance to accelerator depression beyond the point of partial accelerator depression. This provides the driver with a sensory impression of relative accelerator depression to limit vehicle maximum speed, make the driver aware of rapidly accelerated starts, and encourage engine throttle economy.

FURTHER OBJECTS AND ADVANTAGES OF THE INVENTION

An object of this invention is to provide a positive sensory impression of accelerator depression beyond preselected limits. According to this aspect of the invention, the throttle resistor of this invention is provided with a plunger which intercepts the accelerator at a preselected level of depression. The plunger provides increased accelerator resistance to further depression upon contact with the pedal.

An advantage of this throttle resistor is the driver need no longer rely on his eyes and ears to detect either excessive vehicle speed or excessive vehicle acceleration. The seeing and hearing senses of the driver can thus be fully devoted to standard vehicle operation.

A further advantage of the throttle resistor of this invention is that the position sensing nerves of the foot actuating the automobile accelerator pedal can be relied upon to sense accelerator depression beyond a preselected limit through increased throttle resistance. It has been found that this increased throttle resistance is easily and unmistakably detected. This is true even where the driver has been maintained in a driving sitting position for long periods of time.

Yet another advantage of this invention is that the sense of accelerator relative depression encourages the driver to prevent rapid "jack rabbit" starts. Prevention of "jack rabbit" starts saves gas, tires and unnecessary automobile wear.

A further advantage of this invention is that the disclosed throttle resistor is especially suitable for use on automobiles with automatic transmissions. In such automobiles, driver coordination between automobile speed on one hand, and engine speed on the other hand, is not present. Virtually the only control which can be exerted is the limitation on engine speed through limited accelerator depression.

Yet a further advantage of this invention is that the driver is encouraged to return the throttle to efficient and partially depressed accelerator levels of depression. This encouragement occurs through the increased spring force resisting the downward depression of the driver upon the accelerator when the driver exceeds efficient accelerator depression levels.

A further object of this invention is to disclose a plunger which can be used with virtually any known type of accelerator. According to this aspect of the invention, the plunger is mounted to a cylinder below the path of the accelerator typically in opposition to the accelerator pedal at an elevation where the ball of the driver's foot contacts the pedal.

An advantage of this plunger is that it can work either by contact with the flat underside of an automobile accelerator pedal or, alternately, even with direct contact with the ball of the driver's foot.

Yet a further object of this invention is to provide for simplified adjustment of the plunger relative to the depression of the accelerator. According to this aspect of the invention, the plunger is mounted to a cylinder, which cylinder can be adjusted towards and way from the ball of the driver's foot.

An advantage of the adjustment of the plunger of this invention is that the level at which resistance to throttle depression is provided can be easily changed. Thus, upon encountering changed automobile operating conditions (such as high altitude) or changed automobile levels of operating performance (such as the state of engine tune or the age of the automobile), adjustment of the plunger can easily be made relative to the path of accelerator depression.

Yet a further advantage of this invention is that the adjustment can be provided without the help of a skilled mechanic and preferably by the driver himself.

Other objects, features and advantages of this invention will become more apparent after referring to the following specification and attached drawings in which:

FIG. 1 is a side elevation view illustrating the foot of a driver on a spring biased foot actuated automobile accelerator illustrating the plunger of this invention positioned to contact the under surface of the accelerator at a position sufficient to power the automobile at a speed limit and illustrating in broken lines the point of contact of the accelerator pedal with the plunger of this invention;

FIG. 2 is an expanded side elevation section of the plunger of this invention; and, FIGS. 3 and 4 are illustrations of an alternate embodiment for conveniently mounting the throttle resistor to the floorboard of an automobile.

Referring to FIG. 1, an automobile driver at foot A is shown pressing an accelerator pedal B by pivot about the heel of the driver relative to the floorboard of the automobile. The plunger of this invention is illustrated mounted to and penetrating through the floorboard D which typically separates the driver's compartment from the engine compartment and additionally comprises the fire wall of the engine.

In operation, plunger C of this invention is positioned so that it intercepts a path of accelerator B at a position of partial accelerator depression. Typically, this elevation is adjusted so that sufficient acceleration is provided to the engine to power the vehicle at a preselected speed limit on a level surface.

Beyond the point where contact with the plunger C initially occurs, increased throttle resistance is produced with a corresponding sensory impression to the driver that acceleration beyond that normally required for efficient automobile operation is being used.

It should be appreciated that one of the primary advantages of this invention is that the accelerator plunger herein shown can be readily mounted to and used with almost any type or kind of accelerator. For example, the accelerator hereshown is provided with a floor pivot 14 at the lower end, a spring biased arm 16 by accelerator pedal spring 19 at the upper end, and a pivot 18 attaching arm 16 to the upper end of the accelerator pedal B. Depression of the accelerator pedal provides correspondent depression of arm 16 to the position 16' with correspondent elongation of spring 19' which in turn accelerates the engine to higher speed.

It should be understood that the plunger C hereshown will work contacting the flat surface of the underside of any accelerator pedal. Moreover, in those automobile accelerators where the accelerator pedal is of extremely limited dimension, contact with the sole of the driver's shoe in the practice of this invention can additionally be used.

Referring to the illustration of FIG. 2, the mechanics of this invention can easily be understood. Typically, a sleeve 20 is passed through floorboard D of the automobile at an aperture 22. Sleeve 20 is provided with outside threads 24 and has paired bolts and washers 26, 28 on either side with floorboard D captured therebetween. As is apparent, by rotating sleeve 20 with paired nuts and washers 26, 28 held in a non-rotating disposition, elevation of plunger C towards and away from the floorboard D of the automobile can be controlled.

Interiorly, sleeve 20 is provided with an interior annulus 30 at its upper end. At its lower end, sleeve 20 is provided with inside threads 32 that cooperatively engage the threads of an Allen screw 34.

With Allen screw 34 removed, plunger C is inserted interiorly of sleeve 20. Plunger C includes an elongate narrow shaft 40 which passes through the small aperture of interior annulus 30 and comes in contact with an expanded cylindrical section 44 at the lower end of plunger C. Thus, although plunger C at shaft 40 can pass through annulus 30 for almost its entire length, its upward movement is halted at annulus 30 by the expanded cylindrical section 44.

Bias of plunger 40 to the fully extended position is provided by a spring 46. Spring 46 captured between the expanded cylindrical section 44 of plunger C and Allen screw 34 normally urges plunger C to its full elevated position.

Referring to FIGS. 3 and 4, an alternate embodiment for mounting sleeve 20 to the floor of an automobile is illustrated. This alternate embodiment may best be explained simultaneously with the method of mounting the sleeve 20 to the floorboard of an automobile.

Initially, a hole is drilled in floorboard D having a dimension slightly larger than the outside diameter of cylinder 20. Thereafter, cylinder 20 is secured to a special floor mounting flange illustrated in FIG. 3.

Referring to FIG. 3, flange 50 is shown including a circular section 52 with two protruding ears 53, 54. Each of the ears is pierced with a screw receiving aperture 56 through which sheet metal screws 58 are passed. Centrally of the circular section 52 of flange 50 a bolt 60 is secured to the flange. The outside threads 24 of sleeve 20 are threaded through bolt 60 so that plunger C protrudes outwardly and above floorboard D.

Typically, a lock bolt 62 is threaded from the upper portion of sleeve 20 down on to bolt 60 secured to flange 50. When, by threaded movement, plunger C is advanced to its desired elevation, lock bolt 62 is moved down on top of bolt 60 to fastened sleeve 20 to flange 50 to secure and prevent further threaded movement of sleeve 20 relative to flange 50.

It should be apparent that this invention will admit of modification without departure from the spirit and scope of the invention as set forth herein. Likewise, other alternations could be made without departing from the spirit of this invention.

We claim:

1. In combination with an automobile accelerator having a preselected path for depression between an unaccelerated position and an accelerated position, and a first spring bias for biasing said automobile accelerator pedal from said fully depressed position to said undepressed position, the improvement comprising: a plunger having a preselected upper stroke and a fully depressed position; a second spring bias for biasing said plunger to said upper stroke and yielding to permit plunger depression upon exertion of a force greater than the bias provided by said first and second spring bias; means for mounting said plunger to the floorboard of said automobile with said plunger protruding towards said automobile accelerator pedal; and, means for adjusting the elevation of said plunger relative to said automobile floorboard to provide said automobile accelerator pedal with increased resistance at a preselected point along the arcuate path of said accelerator foot pedal.

2. The combination of claim 1 and wherein said plunger contacts the underside of said automobile accelerator pedal.

3. The combination of claim 1 and wherein said means for adjusting the elevation of said plunger includes a threaded sleeve mounted about said plunger and at least one threaded bolt secured to the floorboard of said automobile and threaded to said sleeve.

* * * * *